United States Patent
Elson (10) Patent No.: US 9,341,004 B2
(45) Date of Patent: May 17, 2016

(54) CYCLE ACCESSORY

(71) Applicant: Patrick Elson, Reading (GB)

(72) Inventor: Patrick Elson, Reading (GB)

( * ) Notice: Subject to any disclaimer, the term of this patent is extended or adjusted under 35 U.S.C. 154(b) by 0 days.

(21) Appl. No.: 14/349,878

(22) PCT Filed: Oct. 4, 2012

(86) PCT No.: PCT/GB2012/000760
§ 371 (c)(1),
(2) Date: Apr. 4, 2014

(87) PCT Pub. No.: WO2013/050728
PCT Pub. Date: Apr. 11, 2013

(65) Prior Publication Data
US 2014/0230498 A1   Aug. 21, 2014

(30) Foreign Application Priority Data

Oct. 5, 2011   (GB) .................................. 1117225.1

(51) Int. Cl.
*E05B 71/00*   (2006.01)
*B62J 15/00*   (2006.01)
*B62H 5/00*   (2006.01)

(52) U.S. Cl.
CPC .................. *E05B 71/00* (2013.01); *B62H 5/00* (2013.01); *B62H 5/003* (2013.01); *B62J 15/00* (2013.01); *Y10T 70/402* (2015.04)

(58) Field of Classification Search
CPC ..... E05B 71/00; E05B 73/00; E05B 73/0005; B62H 5/00; B62H 5/003; B62H 5/001; B62H 5/006; B62H 5/02; B62H 5/04; B62H 5/06; B62H 5/147; B62H 5/145; Y10T 70/402; B62J 15/00
USPC .......... 70/233–236, 20, 31, 35, 36, 41, 42, 43, 70/44, 45–47, 30, 49, 53, 225, 226, 227,70/18; 280/847, 152.05, 152.1, 152.2, 280/152.3
See application file for complete search history.

(56) References Cited

U.S. PATENT DOCUMENTS 3,908,414 A * 9/1975 Thorne .............................. 70/18
3,933,015 A * 1/1976 Balicki .............................. 70/49
(Continued)

FOREIGN PATENT DOCUMENTS

DE         171104      5/1906
DE       29622279 U1   9/1997
(Continued)

OTHER PUBLICATIONS
Internet Search for folding bicycle lock. http://www.google.co.uk/search?q=folding+bicycle+lock&rls=com.microsoft:en-gb:IE-S . . . Retrieved on Jun. 16, 2011.
(Continued)

*Primary Examiner* — Christopher Boswell
*Assistant Examiner* — Amanda L Miller
(74) *Attorney, Agent, or Firm* — Meunier Carlin & Curfman LLC (57) ABSTRACT

The invention relates to a dual use cycle accessory which may adopt a first folded configuration in which it forms a mudguard and a second unfolded configuration in which is comprises tow free ends (101, 201) which may be locked together to form a locked loop suitable for locking a cycle, preferably a bicycle, to a stationary object. Thus in accordance with one aspect, of the invention there is provided a dual use cycle accessory device comprising a plurality of elongate rigid members (1, 2, 3, 4) that are articulated one to another so that the rigid members (1, 2, 3, 4) may be arranged in a first folded configuration in which at least some of the members are arranged side by side to define an elongate mudguard and a second extended configuration in which at least some of the members are arranged in series so that a free end region of one member 1, 10) and a free end region of another distal member (4, 404) may be looped together, and wherein said free end regions (19,404) are adapted to be lockable together to form an elongate looped cycle lock (8). The rigid elongate members preferably have a generally planar configuration with a greater width than depth.

21 Claims, 11 Drawing Sheets

(56) References Cited

U.S. PATENT DOCUMENTS

| | | | |
|---|---|---|---|
| 4,271,690 A * | 6/1981 | Jaulmes | 70/233 |
| 4,760,718 A * | 8/1988 | Muramatsu et al. | 70/18 |
| 4,966,382 A * | 10/1990 | Giles | 280/288.4 |
| 5,018,374 A * | 5/1991 | Montano | 70/233 |
| 5,251,796 A * | 10/1993 | Shelhart | 224/454 |
| D347,988 S * | 6/1994 | Thorne | D8/333 |
| 5,386,961 A * | 2/1995 | Lu | 248/223.41 |
| 5,405,113 A * | 4/1995 | Jaw | B62J 11/00 224/425 |
| 5,406,811 A * | 4/1995 | Nakai | 70/26 |
| 5,475,993 A | 12/1995 | Kuo | |
| 5,694,797 A * | 12/1997 | Kuo | 70/53 |
| 5,761,934 A * | 6/1998 | Kuo | 70/49 |
| 5,836,491 A * | 11/1998 | Chuang | 224/456 |
| 6,109,074 A * | 8/2000 | Du | 70/18 |
| 6,199,883 B1 * | 3/2001 | Gable | B62J 15/00 280/152.1 |
| 6,557,808 B1 * | 5/2003 | Ling | 248/229.1 |
| 6,659,483 B2 * | 12/2003 | Blythe | 280/152.3 |
| 6,913,274 B2 * | 7/2005 | Hsu | 280/152.1 |
| 6,945,081 B1 * | 9/2005 | Lopes | 70/233 |
| 6,971,564 B2 * | 12/2005 | Yang | 224/456 |
| 7,437,898 B2 * | 10/2008 | Su | 70/14 |
| 7,481,084 B1 * | 1/2009 | Wu | 70/18 |
| 7,581,787 B2 * | 9/2009 | Livne | 297/215.13 |
| 7,712,339 B2 * | 5/2010 | Hentschel et al. | 70/30 |
| 7,815,082 B1 * | 10/2010 | Arnone et al. | 224/427 |
| 8,555,682 B2 * | 10/2013 | Trunek | 70/58 |
| 8,851,348 B2 * | 10/2014 | Zuraski | B62H 5/00 224/425 |
| 2003/0029209 A1 * | 2/2003 | Kuo | 70/233 |
| 2006/0150691 A1 * | 7/2006 | Truss | 70/39 |
| 2007/0277569 A1 * | 12/2007 | Vitali | 70/233 |
| 2008/0011031 A1 * | 1/2008 | Chuang | 70/233 |
| 2009/0025437 A1 | 1/2009 | Hentschel et al. | |
| 2010/0139344 A1 * | 6/2010 | Kuo | 70/466 |
| 2011/0154870 A1 * | 6/2011 | Buhl et al. | 70/233 |
| 2011/0219829 A1 * | 9/2011 | Trunek | 70/58 |
| 2011/0308282 A1 * | 12/2011 | Chen | E05B 67/003 70/15 |
| 2012/0151973 A1 * | 6/2012 | Cheung | 70/49 |

FOREIGN PATENT DOCUMENTS

| | | |
|---|---|---|
| FR | 2765852 A1 | 1/1999 |
| GB | 477130 A | 12/1937 |
| GB | 598021 A | 2/1948 |
| GB | 2261909 A | 6/1993 |
| JP | 07069258 | 3/1995 |
| JP | 11034949 | 2/1999 |
| JP | 2002234475 A | 8/2002 |
| JP | 2008179973 A | 8/2008 |
| WO | 89/04271 A1 | 5/1989 |

OTHER PUBLICATIONS

Halfords, Abus Bordo Folding Key Lock. http://www.halfords.com/webapp/wcs/stores/servlet/product_storeId_10001_catalogId1 . . . Retrieved on Jun. 21, 2011.

Evans Cycles, Abus Bordo Granit X-Plus Folding Lock. http:www.evanscycles.com/products/abus/bordo-granit-x-plus-folding-lock-ec027388?u . . . Retrieved on Jun. 6, 2011.

International Preliminary Report on Patentability for PCT/GB2012/000760 dated Apr. 17, 2014.

International Search Report for PCT/GB2012/000760 dated Dec. 21, 2012.

* cited by examiner

CYCLE ACCESSORY

The present invention relates to the field of cycle accessories and components. In particular the invention relates to a dual use cycle accessory device which functions as both a mudguard and a cycle lock.

The invention relates in particular to bicycles, and especially pedal bicycles. It is however envisaged that the invention may equally well be applied to cycles in general, including motorcycles, motor tricycles or pedal tricycles.

It is desirable for a cyclist to be able to lock their cycle to an immovable object so that they may leave the cycle unattended without it being stolen or moved.

Many types of cycle lock are presently available to the cyclist. Common examples include those formed from a flexible loop of chain or cable with padlockable ends, or rigid locks such as 'D' locks.

By virtue of their nature, cycle locks of the present state of the art are generally bulky, heavy and inconvenient to store and transport. Thus D-locks are commonly provided with a bracket so as to permit mounting on the cycle frame.

Commonly cycles are provided with many accessories which all add to the overall weight of the cycle when in use. This can be of particular importance when the cycle is a pedal bicycle. Many attempts have been made to reduce the weight of individual accessories or components, however multi-purpose accessories are not commonplace.

Furthermore individual components of cycles such as wheels, lights and mudguards may be stolen despite the cycle itself being locked to an object.

It is amongst the objects of the invention to solve one or more of these problems.

In a first aspect the invention provides a dual use cycle accessory device comprising a plurality of elongate rigid members that are articulated one to another so that the rigid members may be arranged in a first folded configuration in which at least some of the members are arranged side by side to define an elongate mudguard and a second extended configuration in which at least some of the members are arranged in series so that a free end region of one member and a free end region of another distal member may be looped together, and wherein said free end regions are adapted to be lockable together to form an elongate looped cycle lock.

In preferred embodiments, the number of rigid members which the accessory device comprises is 3 or 4 although other embodiments comprising more elongate rigid members are also envisaged. It would also be possible to have an embodiment with just two rigid members. The elongate rigid members may be of the same or different lengths.

The cycle accessory, particularly the elongate rigid members, may be formed from a number of different materials such as toughened steel or carbon fibre. The selection of a material depends upon the degree of security required. Rubber, plastics and polymers may also be used in the accessory's construction.

The rigid elongate members may have a generally planar configuration with a greater width than depth, for example a blade-form. Different embodiments of the invention may have members of different widths.

The members of a particular embodiment may be designed such that when in their first folded configuration, they form a mudguard having a width which is the same as or slightly greater than the width of the cycle tyre with which the lock is intended to be used. For example, a specific embodiment of the invention may be intended for use with push bicycles intended for road use which have relatively thin tyres. In pedal bicycles intended for off-road use, the tyres will commonly be much wider. In preferred embodiments, the widths of each of the elongate rigid members will be such that their cumulative width when in their first folded conformation is the same as or larger than the type of cycle tyre with which they are intended to be used.

The rigid elongate members may each be longitudinally curved or be provided with at least one elbow, so as to form a curved or non-linear mudguard when in the first folded configuration and so as to facilitate the formation of a lock loop in the second configuration. The curve may be a curve of a constant radius. The elbow or elbows may comprise two or more linear sections joined by a curved section or curved sections such that the linear sections are disposed at angles to each other. In a preferred embodiment, the curvature or non-linear nature of the rigid elongate members corresponds to the curvature of the bicycle wheel with which the accessory is intended to be used.

At least some of the rigid members may be articulated one to another by means of respective single-axis hinges. At least some of the rigid members may be articulated to each other by means of ties such as flexible cable or chain links.

In one embodiment, at least two of the rigid members have loops disposed on their respective ends and their articulation is achieved by the linking of the two loops with a single rigid and elongate link of chain. In another arrangement a single cable may be threaded longitudinally through one or more of the rigid members so as to provide multiple articulated joints. In place of a cable a single chain may be threaded through the rigid members. Also, in yet another arrangement multiple cable or chain portions are provided which are attached to the end of the rigid members to connect members together.

The rigid members may be arranged and connected in the second extended configuration so as to be capable of forming two loops which are each adapted to be independently lockable. This allows a user of a bicycle to lock separate parts of the bicycle to an object. For example to lock each wheel of a bicycle to an object to prevent their individual theft. A flexible elongate tie may be provided to attach a rigid member of one loop to a rigid member of the other loop. The accessory may comprise more than two loops, for example three or four loops.

The cycle accessory device may further comprise a mount such as a mounting bracket which is adapted to be attached to a cycle frame or other component, and further adapted to removably engage with the folded members. The mounting bracket may be adapted to engage with one end region of the mudguard so that the mudguard cantilevers from the bracket. The mounting bracket may be adapted to be attached to a cycle seat post so as to provide a rear mudguard. Equally the mounting bracket may be adapted to be attached to a different part of a bicycle such that the mudguard cantilevers from the bracket such that it is positioned above the front wheel of a bicycle.

In one arrangement the mounting bracket may be adapted to engage with a mudguard end region by means of a dovetail-type joint. There may be two dovetail-type joints, disposed side by side and each associated with one end of a respective rigid member. The dovetail-type joint may comprise a T-form spigot and a corresponding T-section slot for accommodating the spigot. There may be a spigot projecting from one end of one rigid member and a slot provided at one end of another rigid member, and a corresponding respective slot and spigot disposed side-by-side on the mounting bracket.

The bracket may be provided with means for adjusting and fixing an angle of elevation of the mudguard. The elevation adjusting means may comprise a generally cylindrical collar portion which accommodates a corresponding cylindrical plug.

Mating surfaces of the collar and/or plug may be formed with axially extending, circumferentially spaced apart grooves and/or ribs which can inter-engage so as to permit the plug to adopt a plurality of fixed discrete rotational positions in the collar.

The said lockable free end regions of the rigid elongate members may be lockable by virtue of one free end region being provided with a lock block which is provided with an entry configured and oriented to receive a locking spigot provided at the other free end region when the elongate members are in the extended second configuration.

The lock block may be provided with a second entry which is configured and oriented to receive the spigot when the members are in the first folded configuration, so as to retain the members in the folded configuration.

First and second entries may be provided on opposite side regions of the lock block. The first and second entries may be provided by opposite end regions of a single bore through the lock block.

The lock block may be elongate and generally transversely oriented with respect to the members when in both the folded and unfolded configurations.

The first entry and, if present, second entry may be formed in side regions of the lock block.

The lock block may have a generally cylindrical configuration and the entry or entries may have a generally radial orientation.

There may be two entries which are oriented to be diametrically opposed.

The lock block and locking spigot may lock together in the same way as the male and female portions found on a conventional 'D' lock.

The plug may be provided with a rotatable portion on which the lock block is disposed, wherein the rotatable portion is rotatable about the plug's cylindrical axis.

When the accessory device is in its first folded configuration the locking spigot on one rigid member may approach the lock block from a first direction. When the accessory device is in its second extended configuration, the locking spigot may approach the lock block from a different radial direction. The rotatable portion of the plug permits the locking of the lock block and locking spigot together in both the first folded and second extended configurations. It also allows the user to select the angle at which the locking member approaches the plug whilst preserving the correct locking alignment. This essentially allows a number of different shaped locked loops to be formed.

The cycle accessory device may be provided with one or more transverse straps or ties to hold the members together in the first folded configuration.

At least two adjacent elongate rigid members of the cycle accessory device may be provided with one or more engaging features which hold the members together in their first folded configuration. The engaging features may comprise for example: at least one male and at least one female clip disposed on adjacent members or, one or more magnetic latches.

The free end regions of the looped members may be adapted to be locked together by the provision of features such as bores which can receive a lock such as a padlock. Alternatively the free ends may be provided with locking fixtures, as is conventional in the field of cycle leads.

Following is a description by way of example only and with reference to the figures of the drawings of modes for putting the invention into effect. In the drawings.

FIRST EMBODIMENT

According to one embodiment of the invention there is provided a cycle accessory device as depicted in FIGS. 1-8. The accessory comprises four rigid elongate body portions (1, 2, 3, 4). In FIGS. 1-3 and 5 the body portions are shown in their folded, side by side configuration. They define a mudguard comprising an underside (9) which is formed from the undersides of the individual body portions. In use the accessory may be attached by a mounting bracket (not shown) to a bicycle (not shown) such that the underside (9) of the mudguard is disposed above a wheel of the bicycle.

The body portions each have a generally rectangular cross section, the width thereof being greater than the depth. Each body portion has a central elongate region (301, 302, 303, 304), a first end region (101, 102, 103, 104) and a second end region (201, 202, 203, 204). The first and second end regions are both angled downwardly with respect to the plane of the central regions at an angle of 30-50°. Each of the first end regions is provided with respective first terminal blocks (401, 402, 403, 404). Their respective second end regions are provided with respective second terminal blocks (501, 502, 503, 504). The terminal block (404) of the fourth body portion (4) is an elongate projection which projects downwardly past the blocks (402 and 403) of the second (2) and third (3) body portions. The elongate extension (404) is joined to a distal side wall region of an elongate cylindrical lock body (8). The cylindrical lock body is orientated transverse to the length of the body portions.

The device is provided with male and female locking members which are adapted to lock the ends of first and fourth body portions of the device together. The male locking member (10) is attached to the first terminal block (401) of the first body portion (1). The male locking member is generally cylindrical and projects from the end of the first terminal block (401) in the same plane as the first end region (101) of the first body portion. The male locking member (10) comprises annular ribs (not shown) around an end which is distal to the terminal block (401). It is thereby adapted to engage with the female locking member. The female locking member is located at a region of the lock body (8) which is distal to the lock body's connection to the elongate extension (404). The female locking member is a tubular channel (not shown) which extends through the lock body such that two circular openings (52, 53) are formed on opposite sides of the lock body (see FIGS. 5 and 3). An internal locking mechanism (not shown) is contained within the lock body. The locking mechanism is arranged such that in use the male locking member (10) may be inserted into either of the channel's openings to engage with the internal locking mechanism. The lock body's internal locking mechanism and the locking member operate in a similar way to the male and female parts of a conventional 'D' cycle lock. The lock body and the locking members are moveable between locked and unlocked positions. In the locked position, the lock body and the locking members are locked together. In the unlocked position, the locking member is removable from the lock body. In order for the lock body and the locking member to be moved between their locked and unlocked positions a key must be inserted into the slot (11).

When the accessory device is in its extended and unlocked configuration (not shown), the male locking member (10) will only be able to approach the lock body (8) radially and from the opposite side to which it approaches the lock body when the accessory is in its folded configuration. The channel extends through the lock body to allow the locking member (10) to access to the internal locking mechanism from either side of the lock body via the respective openings (52 and 53). The orientation of the locking member (10) relative to the lock body in the unfolded configuration is most easily seen in FIGS. 4 and 6-8.

The second terminal blocks (503 and 504) of the fourth and third body portions are joined together by a flexible steel cable (5). The second terminal blocks (501 and 502) of the first and second body portions are joined by a flexible steel cable (6). The first terminal blocks (403 and 402) of the second and third body portions are connected by a flexible steel cable (7). The flexible steel cables (5, 6 and 7) are all of the same length and take the form a 'U' shape when the body portions are in their folded configuration.

Figure 1:
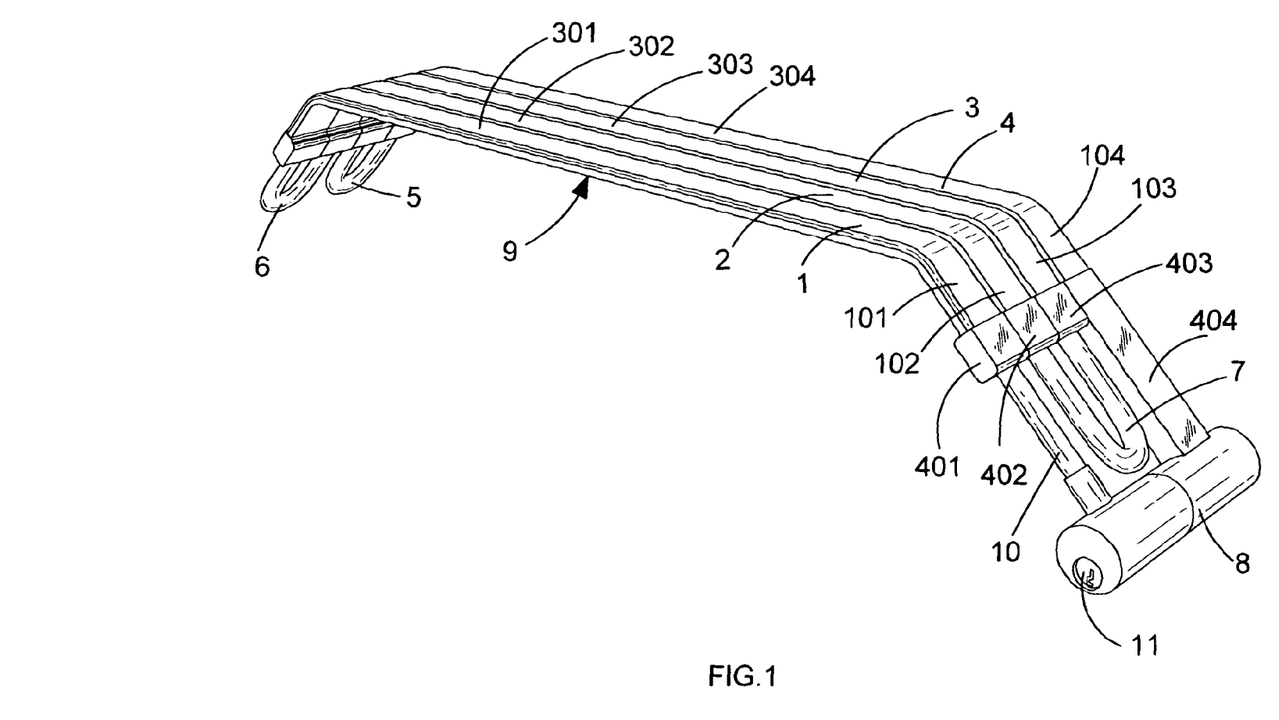
FIG. 1 is a perspective three quarter view of a cycle accessory device according to a first embodiment of the present invention in its folded configuration.
Figure 2:
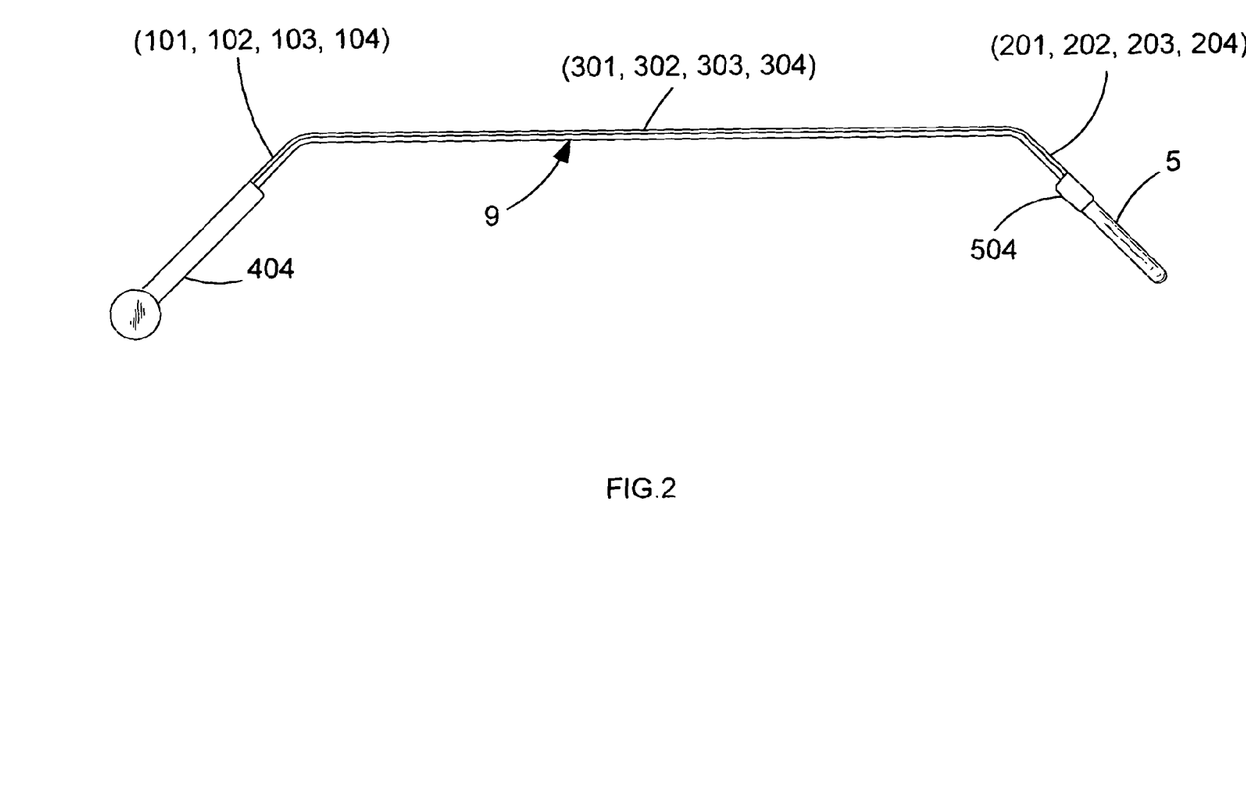
FIG. 2 is a side view of the folded cycle accessory device.
Figure 3:
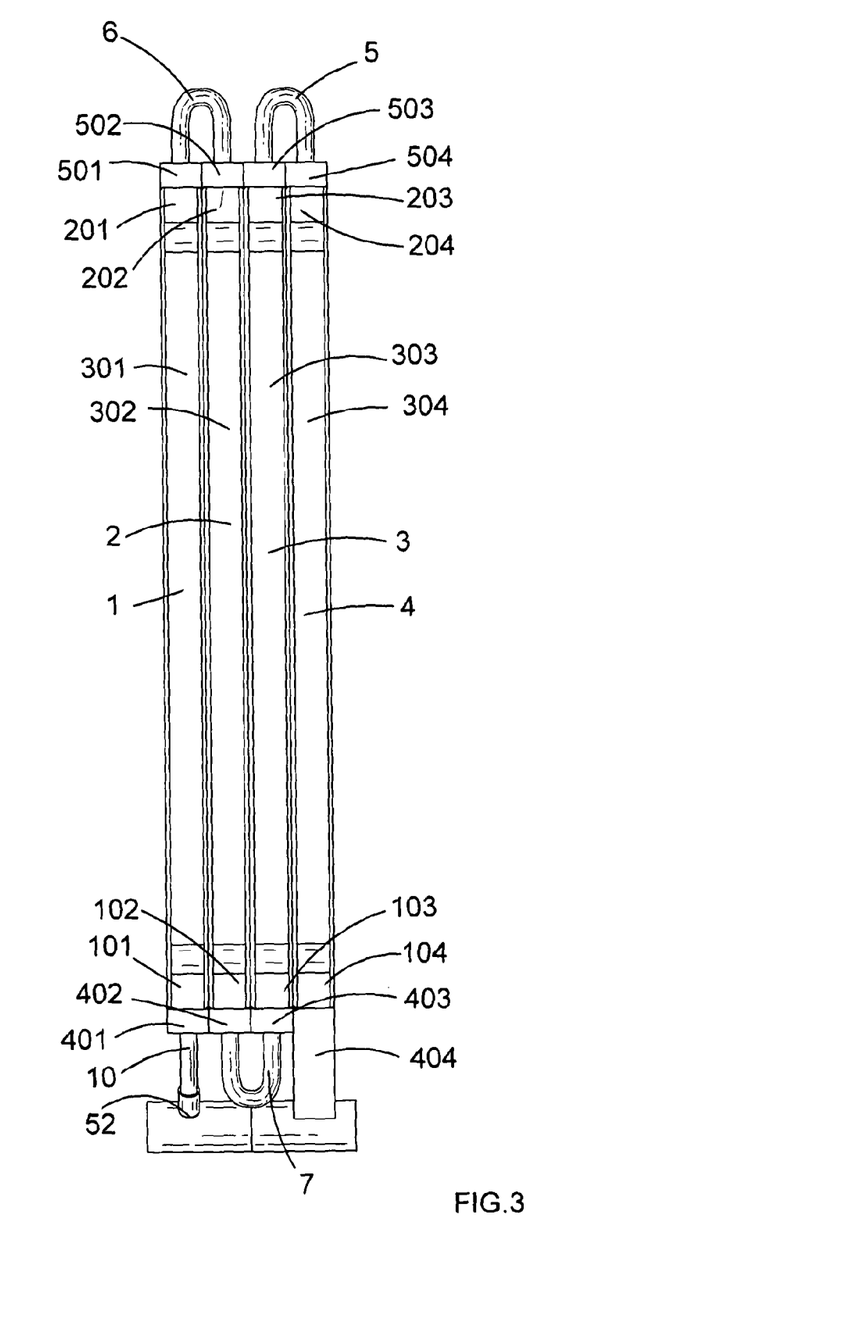
FIG. 3 is a plan view from the top of the cycle accessory device.
Figure 4:
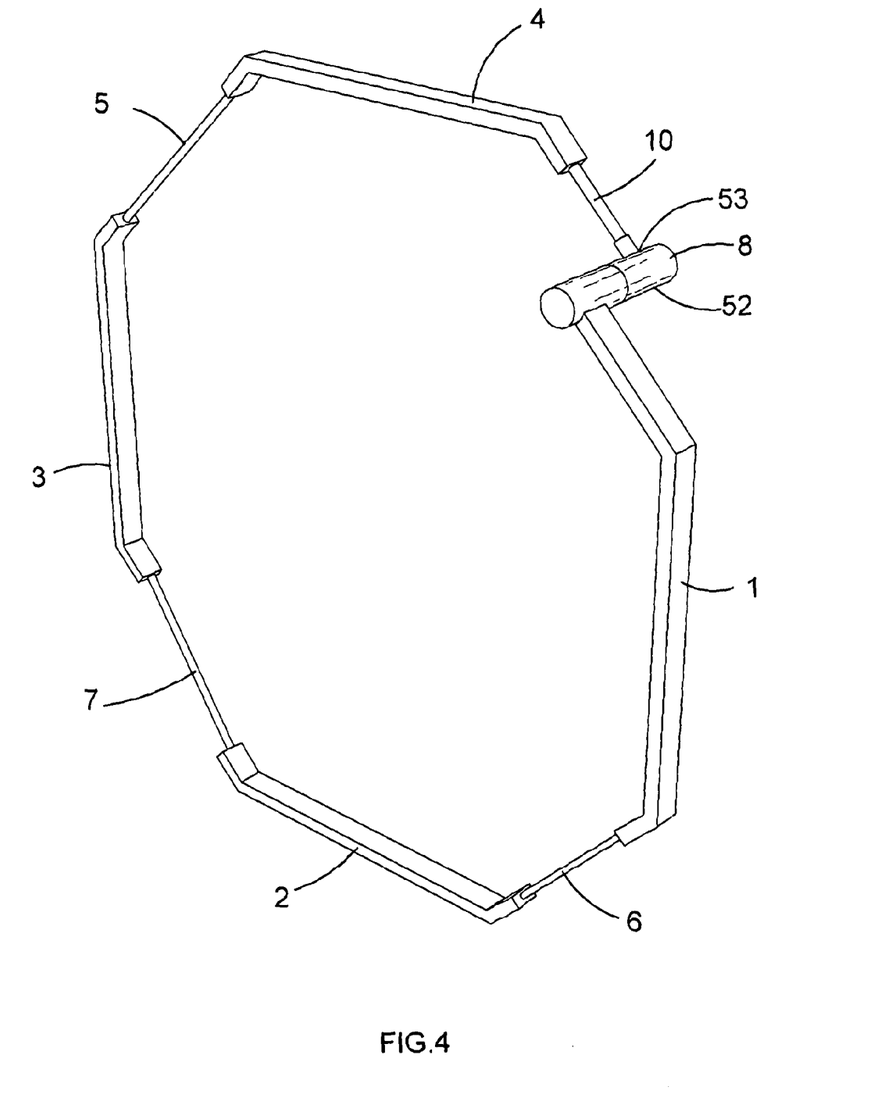
FIG. 4 is a perspective three quarter view of the cycle accessory device in its second extended configuration.
Figure 5:
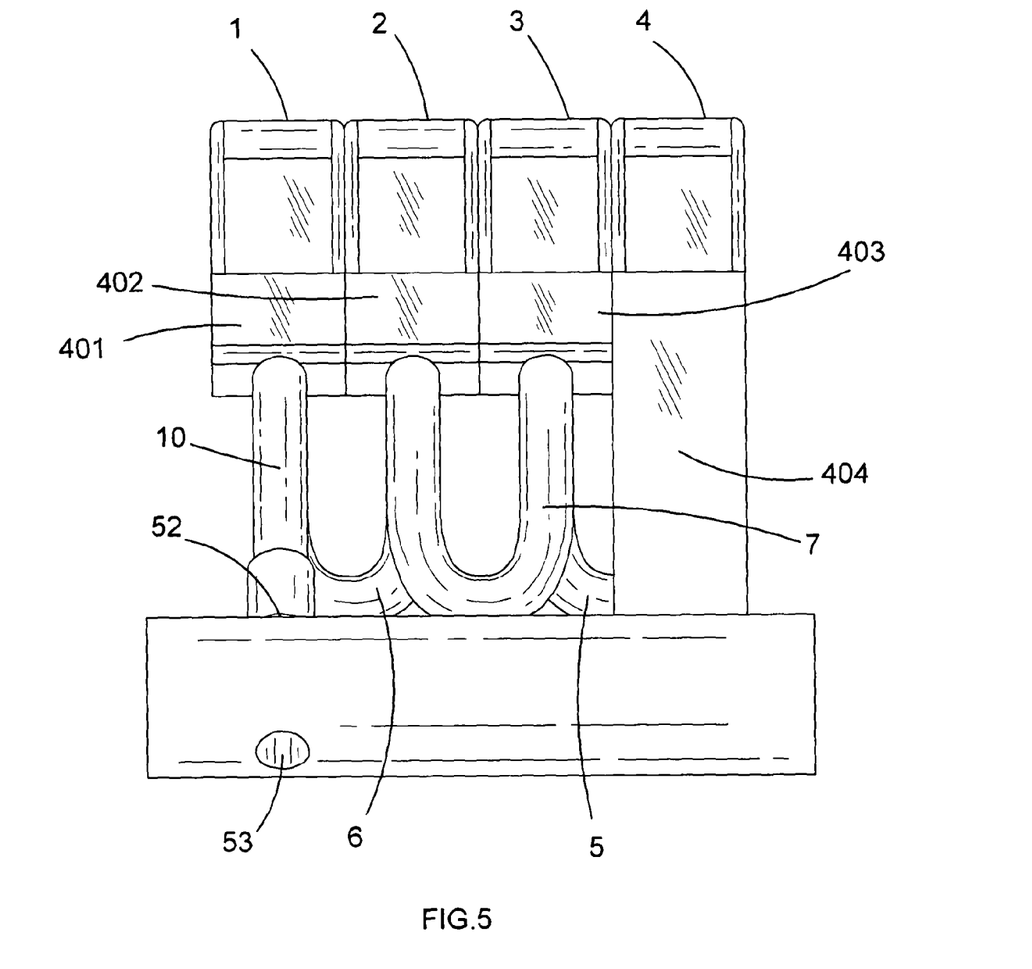
FIG. 5 is a front view of the cycle accessory device in its first folded configuration.
Figure 6:
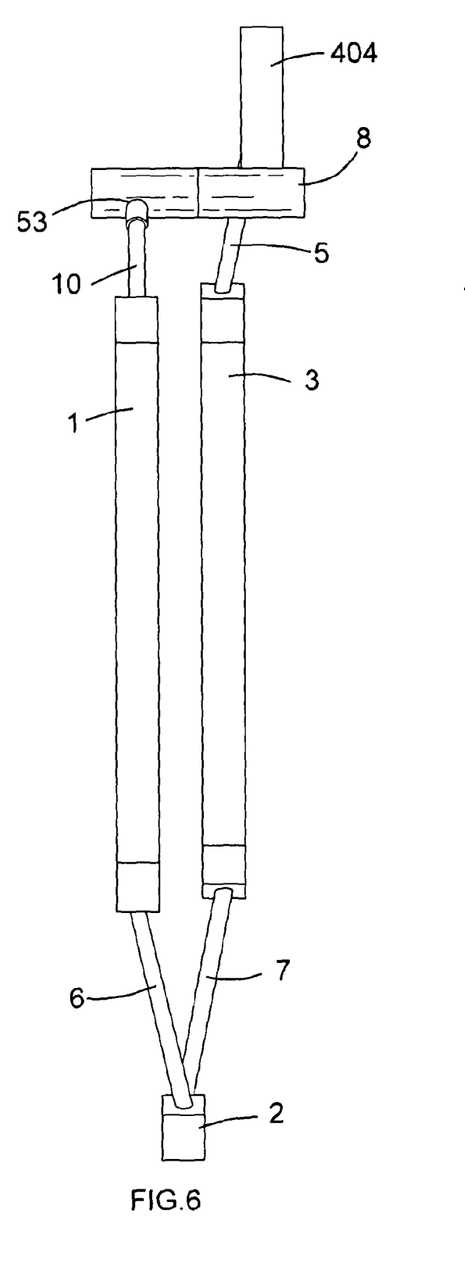
FIG. 6 is front view of the cycle accessory device in its second extended configuration.
Figure 7:
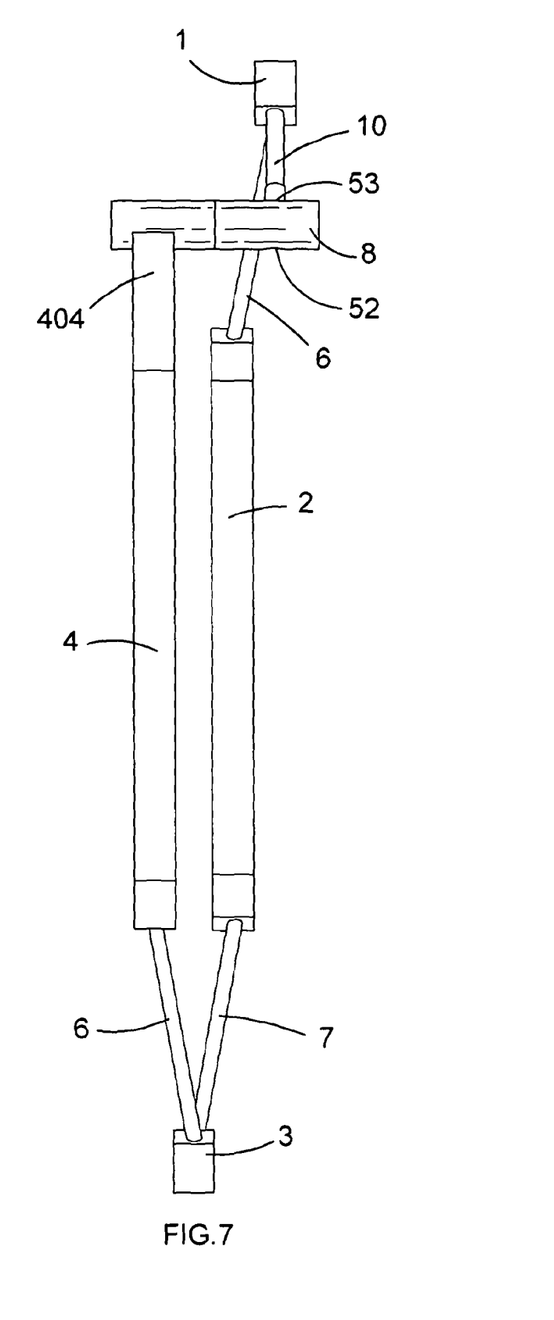
FIG. 7 is a back view of the cycle accessory device in its second extended configuration.
Figure 8:
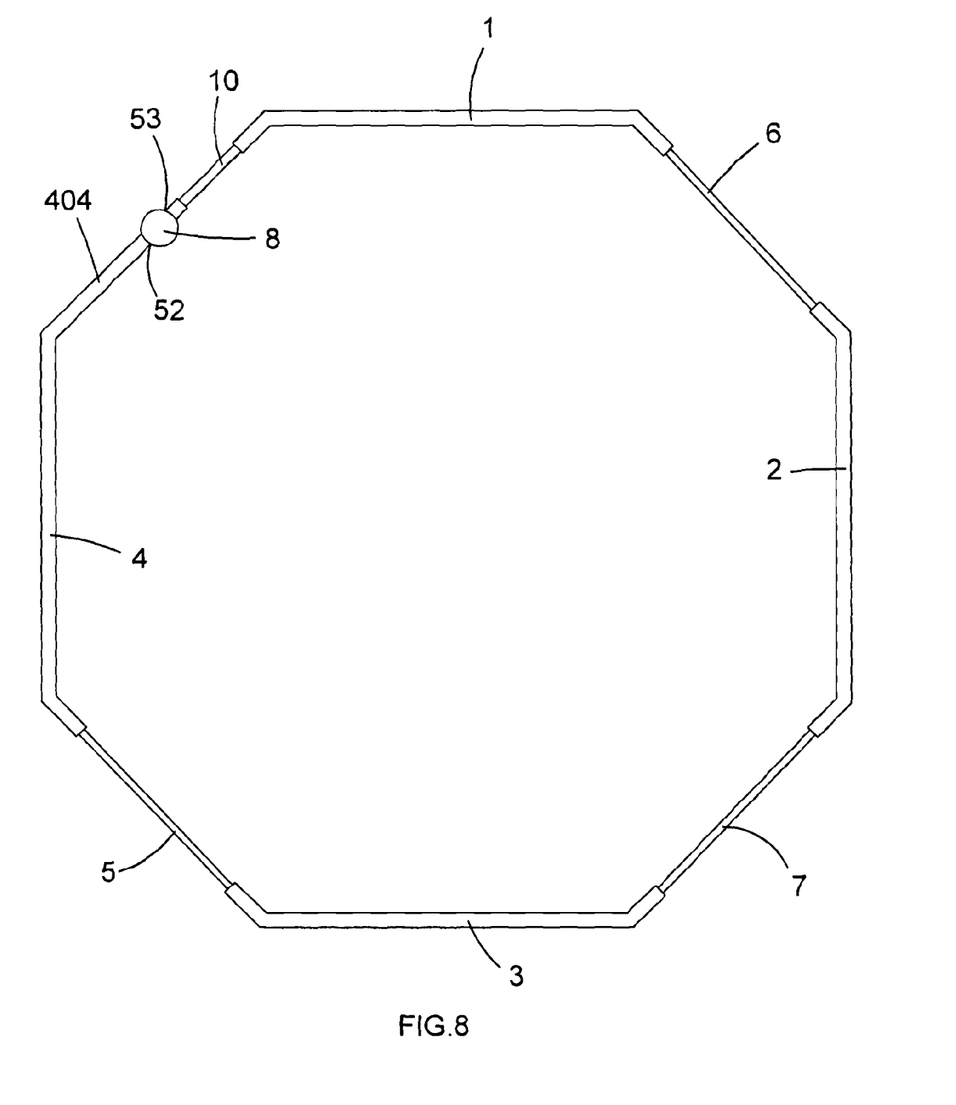
FIG. 8 is a side view of the cycle accessory device in its second extended configuration.

FIG. 4 shows the device in an extended and locked configuration. In this configuration, and when the cylindrical lock body and locking member are in their unlocked configuration, the lock body and locking member may be separated to provide free ends. The free ends may be threaded through the frame or another suitable part of a bicycle, brought together to form a loop and locked around an immovable object. FIG. 8 shows the generally octagonal nature of the loop in its extended and locked configuration.

SECOND EMBODIMENT

Another embodiment of the invention (not shown), has identical features to the first embodiment except for those of the cylindrical lock body. In this embodiment the lock body comprises a first half which is connected to the elongate extension (404) (see FIG. 1) in the same way as in the first embodiment. Half way along its length the cylindrical lock body is rotatably coupled to its second half such that the second half may rotate freely about the cylindrical axis of the lock body. The second half of the lock body contains an internal locking mechanism. Rather than having a channel which extends through the whole locking portion, the second half of the locking portion comprises a single circular opening in its curved outer wall. This opening is adapted to receive the locking member such that the locking member may engage with the internal locking mechanism. This arrangement permits the rotation of the opening such that when the accessory is in its folded configuration, the aperture of the second half of the cylindrical locking portion may face the male locking member. When the accessory device is in its unfolded and unlocked configuration and the locking member approaches from the opposite side of the lock body, the second half of the lock body may be rotated until the aperture faces the locking member so that it may be engaged with the internal locking mechanism of the lock body.

THIRD EMBODIMENT

Figure 9A:
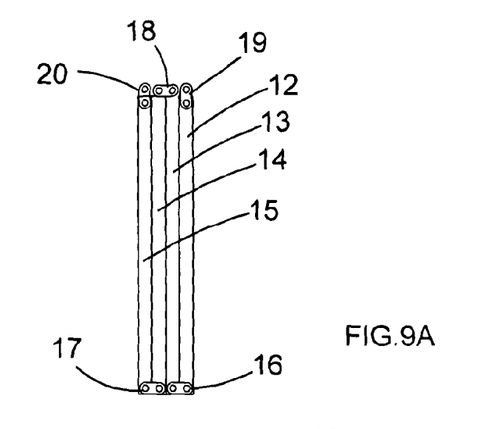
FIG. 9A is a plan view from above of a cycle accessory device in accordance with a second embodiment of the invention in its first folded configuration.
Figure 9B:
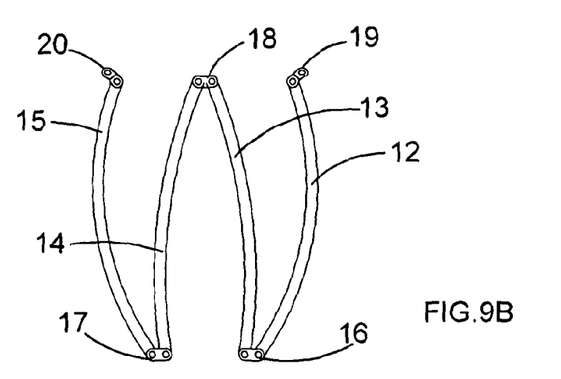
FIG. 9B is a plan view from above of the second embodiment which is partially extended.
Figure 9C:
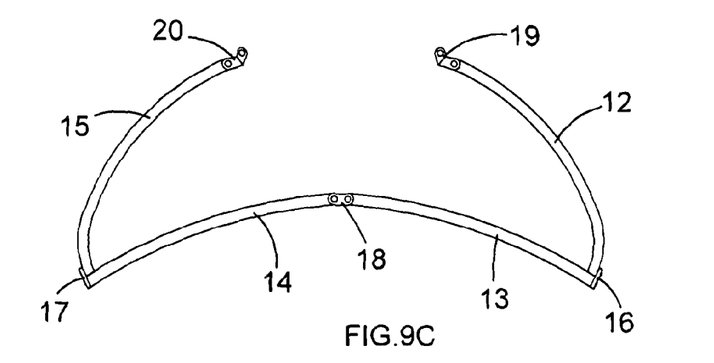
FIG. 9C is a plan view from above of the second embodiment with is further extended.

FIGS. 9A-C show a FIGS. 9A-C show a second embodiment of the invention which comprises four body portions (12, 13, 14, 15). These body portions have an arc shape of constant radius and a generally rectangular cross section. These features are most easily seen in FIG. 9C, The first body portion (12) is connected at a first end to a first end of the second body portion (13). The connection is made by a single axis hinge (16) which is fixed to the respective ends of the body portions (12 and 13). The second body portion (13) is connected at its second end to a first end of a third body portion (14). The connection is made by a second single axis hinge (18) which is fixed to the respective ends of the body portions (13 and 14). The third body portion (14) is connected at its second end to a first end of a fourth body portion (15). The connection is made by a third single axis hinge (17).

At the second ends of the body portions (12 and 15) a locking tab (19, 20) is affixed to the body portions. The locking tabs each comprise an 'L' shaped piece of metal. One arm of the 'L' is attached by a rivet or other fastening means to the respective body portions. The second arm of the 'L' is flush with and upstanding at and angle of 90° from the plane of the end of the body portion. The upstanding arms of the tabs are provided with a hole. When the accessory is in its fully unfolded configuration (not shown), the upstanding arms of the tabs abut such that the holes on each tab are aligned. A user may thread a locking device such as a padlock bolt through the holes, thereby locking the ends of body portions (12 and 15 together.

When the lock is in its fully unfolded configuration, it forms a circular loop. All of the body portions are of equal length and curvature such that each one forms a quarter of the loop. It is the symmetry provided by this arrangement which permits the use of a single axis hinge.

In its folded configuration the body portions (12, 13, 14, 15) are held together by a strap (not shown) which preferably has a Velcro® fastening. The accessory is attached to the seat post by a mounting bracket (not shown). The accessory, in its folded (mudguard) configuration is cantilevered from the mounting bracket such that it is disposed above the rear wheel of the bicycle.

Figure 10A:
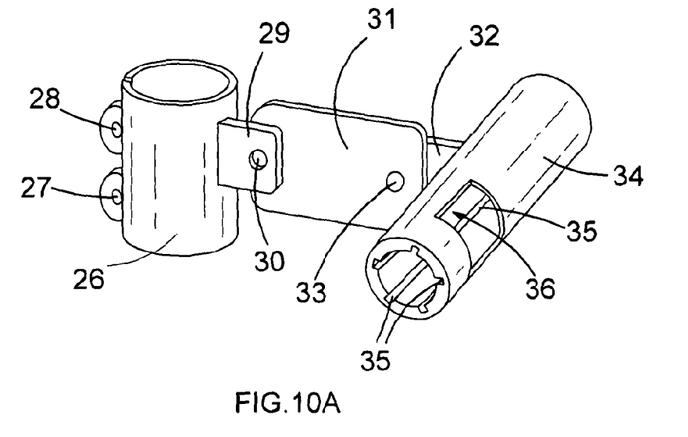
FIG. 10A is a perspective three quarter view of a first mounting bracket for use with embodiments of the invention.

FIG. 10A shows a mounting bracket for use with embodiments of the invention. The mounting bracket comprises a tubular clamping portion (26) which is adapted to be clamped around the seat post of a bicycle or around another part of the frame of the bicycle. The clamping portion may be securely fastened to the bicycle by tightening the bolts (27, 28) which reduces the internal diameter of the clamping portion. The clamping portion comprises a tab (29) disposed on an opposite side of the tube to the bolts (27 and 28). The tab extends axially and has a bolt hole (30) extending therethrough. The mounting bracket further comprises a generally rectangular plate (31). The plate is hingedly attached to the tab (29) by way of a bolt (not shown) which passes through the bolt hole (30) and a corresponding first bolt hole (not shown) on the plate (31). The bolt may be tightened in order to fix the plate (31) at the desired angle to tab (29). The plate (31) comprises a further bolt hole (33) extending therethrough which is disposed in a region of the plate which is distal to the first bolt hole (not shown). The mounting bracket further comprises a tubular collar (34). The collar is attached to the plate (31) by way of a bolt (not shown) which is threaded through the bolt hole (33) and a corresponding hole (not shown) in a tab (32) attached to the collar. This bolt may also be tightened in order to fix the relative angular positions of the plate (31) and the tab (32).

The interior surface of the collar comprises five channels (35) of a square cross section at symmetrical radial positions around its interior circumference. The channels extend axially along the entire length of the collar. The collar also comprises a cutaway (36) wall section having a generally rectangular shape.

Figure 10B:
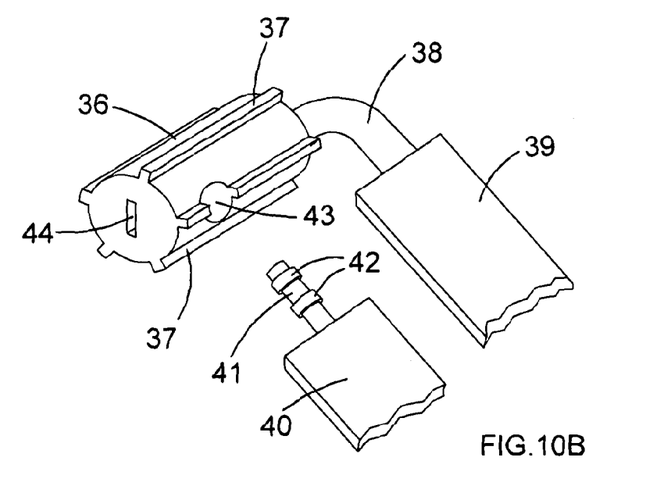
FIG. 10B is a perspective three quarter view of the ends of two rigid elongate members of an embodiment of the invention which are adapted to be received by the mounting bracket of FIG. 10A.

FIG. 10B shows a generally cylindrical plug (36) which is adapted to fit within the collar (34) of FIG. 10A. The plug has protrusions (37) at symmetric radial positions around its outer circumference. The protrusions have a square shaped cross section and extend axially along its whole length. The protrusions are adapted to conform to the dimensions of the channels (35) shown in FIG. 10A. The plug is attached by a curved rigid member (38) to the end of a body portion (39). A second body portion (40) of the accessory comprises a locking member (41). The locking member is generally cylindrical and extends from the end of the body portion (40) in the same plane as the body portion. The locking member comprises a number of annular ribs (42) which are adapted to cooperate with locking features of the plug. The locking features of the plug comprise a hole (43) and internal locking mechanism (not shown). The locking member (41) may be inserted into the hole (43) and pushed home to lock the body portion (40) to the plug and thereby to the body portion (39). The internal locking mechanism may be unlocked by the insertion of a key into the key slot (44). The locking mechanism and locking member cooperate and operate in a similar way to a conventional 'D' bicycle lock.

In use the plug is inserted into the collar (34) at an angular orientation at which the protrusions (37) are slidably engagable with the channels (35). The user ensures that plug is inserted at an angular orientation in which the body portion (39), and therefore the rest of the mudguard, are cantilevered away from the seat post at a desired angle. The locking member (41) is then inserted through the cutaway section (36) of the wall of the collar and located in the hole (43). The locking member is driven home to lock the body portion (40) to the plug. In this configuration, the mudguard cannot be removed from the mounting bracket as the locking member abuts the edge of the cutaway. Use of the mounting bracket and system of FIGS. 11A and 11B also allows the user to select the angle at which the mudguard is cantilevered away from the bicycle by choosing the angular orientation of the insertion of the plug into the collar.

In alternative embodiments, the plate (31) may not be present and the tab (32) may be hingedly connected to the tab (29). In yet further embodiments, tabs (29) and (32) and the plate (31) may not be present. In such embodiments the collar (34) and the clamping portion may be made from a single piece of material and the collar may be joined to the clamping portion (26) by a neck.

Figure 11A:
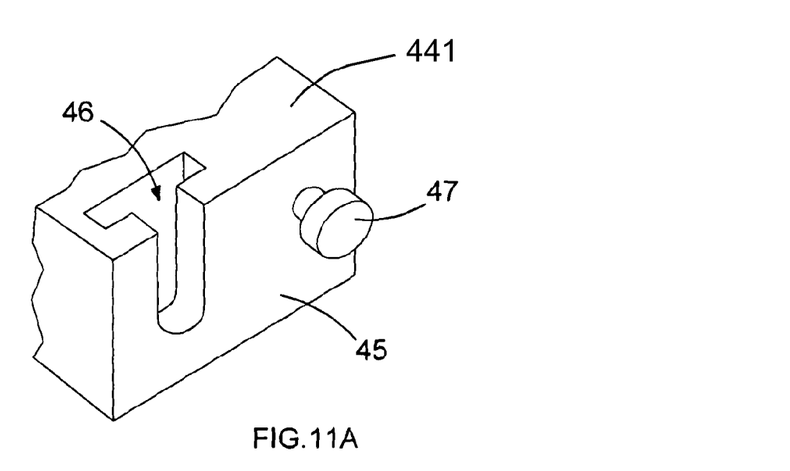
FIG. 11A is a perspective three quarter view of a second mounting bracket for use with embodiments of the invention.

FIG. 11A shows an embodiment of a mounting block according to the present invention. The block is generally an elongate cuboid having an upper surface (441) and an abutment face (45). The block comprises a cut out (46) having a 'T' shaped cross section when viewed from above the upper surface. The cut out forms a slot in the abutment face which is 'U' shaped at its lower end. A spigot (47) if formed adjacent to the slot on the abutment face. The spigot comprises a disc shaped member having a planar circular face which is parallel Lo the abutment face. The disc shaped member is attached to the abutment face by a disc shaped spacer having a smaller diameter than the disc shaped member. When viewed from above the upper surface, the spigot has a 'T' shaped cross section.

Figure 11B:
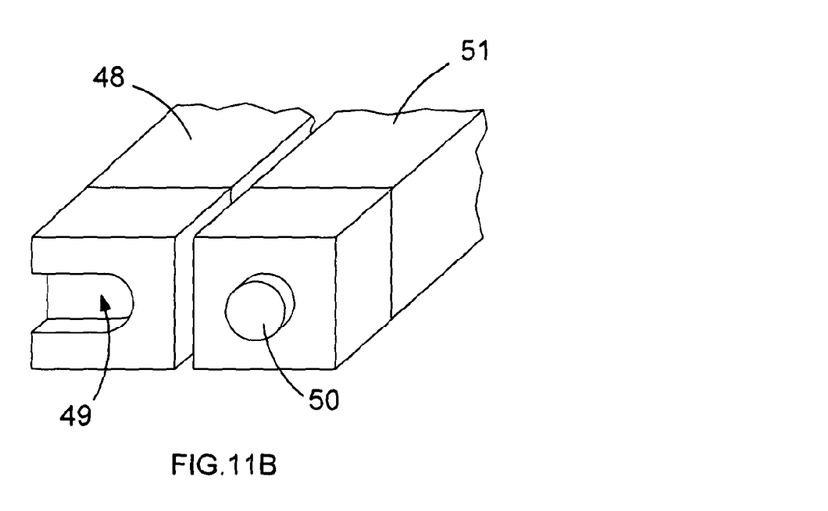
FIG. 11B is a perspective three quarter view of the ends of two rigid elongate members which are adapted to engage with the mounting bracket depicted in FIG. 8A.

FIG. 11B shows the ends of two body portions (51, 48) of an accessory to be used with the mounting bracket of FIG. 11A. In the middle of the end face of the body portion (51) there is disposed a spigot (50) which has identical dimensions to the spigot (47) on the mounting block shown in FIG. 11A. The body portion (48) comprises a cutaway (49) having identical dimensions to the cutaway (46) in FIG. 11A. The cutaway in FIG. 112 forms a slot in the end face of the body portion which extends towards the side face of the body portion (not shown) which faces away from the body portion (51) when the body portions are in their folded configuration. The cut out (49) has a 'T' shaped cross section when viewed looking towards the side face of the body portion (48).

In use the body portions shown in FIG. 11B may be attached to the mounting block in FIG. 11A. When the body portions are in their folded, mudguard configuration as in FIG. 11B, the body portions are rotated until the plane formed by their width is perpendicular to the mounting block. The spigot (47) is inserted into the cut out (49) and pushed home until the spigot abuts the end of the cut out (49). The body portions are then rotated, pivoting about the spigot (47) which is retained by the 'T' shaped cross section of the cut out (49). The spigot (50) follows an arc shaped path towards the upper surface (441) of the mounting block and eventually engages with the cut out (46). The rotation if stopped once the spigot (50) abuts the lower end of the slot formed by the cut out (46). The spacing between the cut out (46) and the spigot (47) on the mounting block is such that when they are engaged with the corresponding features on the body portions, the body portions are disposed flush to one another along their length. Once engaged with the mounting block as described, the body portions of the accessory in their folded, mudguard configuration cannot be disengaged by movement in one direction alone. They must be rotated the opposite sense to the engagement process just described. A secure mudguard to mounting block attachment is therefore provided.

It is clear that the embodiments depicted in FIGS. 1-8 and described above can be combined with the embodiments of FIGS. 10A and 10B as described above, merely by adapting the cylindrical lock body (8) in FIGS. 1-8 to comprise features on its outer surface which could mate with features on the inside of a collar according to FIG. 10A. Equally, the features of the embodiment described above and in FIGS. 1-8 as well as the features of the embodiment described above and in FIGS. 9A-9C can be combined with the mounting bracket described above and in FIGS. 11A and 11B merely by the incorporation of the relevant spigots and cut outs on the cylindrical lock body (8) (FIG. 1), the body portions (12-15) (FIGS. 9A-9C) or the hinges (16-18) (FIGS. 9A-9C).

Figure 12A:
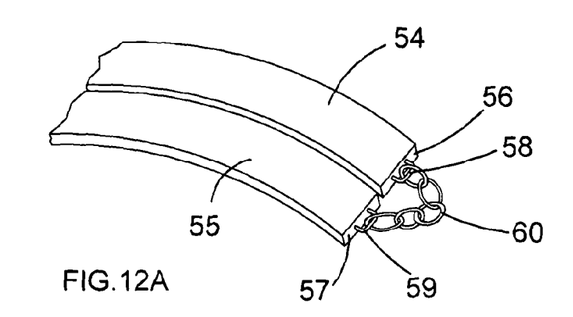
FIG. 12A is a perspective view of two rigid elongate members articulated by chain links.
Figure 12B:
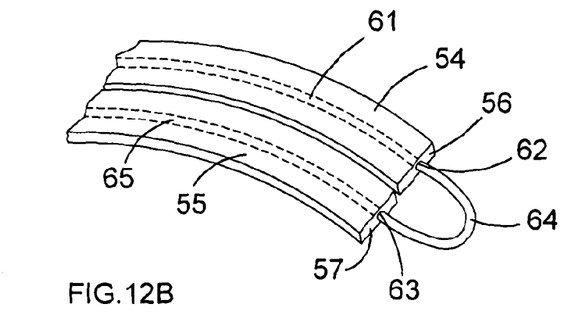
FIG. 12B is a perspective view of two rigid elongate members articulated by a cable running through a channel within the members.
Figure 12C:
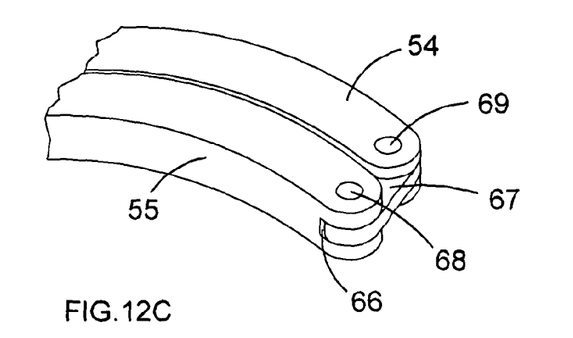
FIG. 12C is a perspective view of two rigid elongate members articulated by way of a single axis hinge.

FIGS. 12A-12C show ways in which the rigid elongate body portions of the accessory device can be articulated one to another. FIG. 12A shows first and second body portions (54, 55). The portions are accurate and have a greater width than depth. The body portions have a generally rectangular cross section which remains constant over their length. The body portions terminate with rectangular end faces (56, 57). Disposed in the middle of each end face is a 'U' shaped loop (58, 59) of metal which is permanently connected at each of its ends to the face. Chain links (60) connect the two loops (58, 59). The alternative arrangement shown in FIG. 12B has the features (54-57) in common with the arrangement of FIG. 12A. A channel (61, 65) runs through the middle of each of the body portions (54, 55). The channel runs along the portions for their entire length. The channel terminates at openings (62, 63) in the centre of the faces (56, 57) and a second pair of openings (not shown) at the other ends of the body portions. The flexible steel cable (64) runs through the channel (61), exits the opening (62). The cable runs through the opening (63) and along the length of channel (65). The cable will be anchored at both ends (not shown) to the rigid body portions (54, 55) or further body portions (not shown) in the accessory device. In this way the cable may be used to provide articulated joints between several body portions.

FIG. 12C shows two body portions (54, 55) articulated together by way of a single axis hinge. The ends of the body portions are provided with cut out portions (66) having a 'U' shaped cross section. A planar hinge portion (67) sits within the cut outs. The hinge portion is pivotally connected to each body portion by way of pins (68, 69) which extend downwardly through the body portions, through bores in the hinge portion and into the body portions below the hinge portion.

The means of articulating the body portions one to another which are shown in FIGS. 12A-12C may be used with any of the embodiments of the invention.

The invention claimed is:

1. A dual use cycle accessory device comprising:
   a plurality of rigid elongate members that are articulated one to another so that the rigid elongate members may be arranged in a first folded configuration in which at least some of the rigid elongate members are arranged side by side to define an elongate mudguard and a second extended configuration in which at least some of the rigid elongate members are arranged in series so that a free end region of a first rigid elongate member and a free end region of a second rigid elongate member may be looped together, and wherein said free end regions are adapted to be lockable together to form an elongate looped cycle lock, the rigid elongate members have a generally planar configuration with a greater width than depth, and
   a mounting bracket which is adapted to be attached to a cycle frame or other component, and further adapted to removably engage with the folded rigid elongate members, wherein the mounting bracket is adapted to engage with the free end regions of the first and second folded rigid elongate members so that the folded rigid elongate members cantilever from the mounting bracket,
   wherein the rigid elongate members are each longitudinally curved or are provided with at least one elbow, so as to form a curved or non-linear mudguard when in the first folded configuration and so as to facilitate the formation of the looped cycle lock in the second extended configuration.

2. A cycle accessory device as claimed in claim 1 wherein at least some of the rigid elongate members are articulated one to another by means of respective single-axis hinges.

3. A cycle accessory device as claimed in claim 1 wherein at least some of the rigid elongate members are articulated one to another by means of a tie.

4. A cycle accessory device as claimed in claim 3 wherein the tie comprises a single cable that is threaded longitudinally through one or more of the rigid elongate members so as to provide multiple articulated joints.

5. A cycle accessory device as claimed in claim 1 wherein the mounting bracket is adapted to be attached to a cycle seat post such that the folded rigid elongate members extend over a rear wheel of the cycle.

6. A cycle accessory device as claimed in claim 1 wherein the mounting bracket is adapted to engage with the free end regions of the first and second folded rigid elongate members by means of a dovetail-type joint.

7. A cycle accessory device as claimed in claim 6 wherein a first dovetail-type joint is associated with the free end region of the first rigid elongate member and a second dovetail-type joint is associated with the free end region of the second rigid elongate member, wherein the first and second dovetail-type joints are disposed side by side in the folded configuration.

8. A cycle accessory device as claimed in claim 6 wherein the dovetail-type joint comprises a T-form spigot and a T-section slot for accommodating the spigot.

9. A cycle accessory device as claimed in claim 8 wherein:
   the T-form spigot is a first T-form spigot and the T-section slot is a first T-section slot,
   the mounting bracket comprises a surface that defines the first T-section slot and a second T-form spigot, the second T-form spigot projecting away from the surface, and
   the first T-form spigot is associated with and projects from the free end region of the first rigid elongate member and is configured for engaging the first T-section slot of the mounting bracket, and
   a second T-section slot is associated with and defined by the free end region of the second rigid elongate member and is configured for receiving the second T-form spigot projecting away from the surface of the mounting bracket.

10. A cycle accessory device as claimed in claim 1 wherein the mounting bracket is provided with a means for adjusting and fixing an angle of elevation of the folded rigid elongate members, the elevation adjusting means comprising a generally cylindrical collar portion which accommodates a corresponding cylindrical plug.

11. A cycle accessory device as claimed in claim 10 wherein mating surfaces of the collar and/or plug are formed with axially extending, circumferentially spaced apart grooves and/or ribs which can inter-engage so as to permit the plug to adopt a plurality of fixed discrete rotational positions in the collar.

12. The cycle accessory device of claim 1 wherein the free end regions of the first and second rigid elongate members are lockable by virtue of the free end region of the first rigid elongate member being provided with a lock block which is provided with an entry configured and oriented to receive a locking spigot provided at the free end region of the second rigid elongate member when the rigid elongate members are in the second extended configuration.

13. The cycle accessory of claim 12 wherein the lock block entry is a first entry and the lock block defines a second lock block entry which is configured and oriented to receive the locking spigot when the rigid elongate members are in the first folded configuration, so as to retain the rigid elongate members in the first folded configuration.

14. The cycle accessory of claim 13 wherein the respective first and second entries are provided on opposite side regions of the lock block.

15. The cycle accessory of claim 13 wherein the first and second entries are provided by opposite end regions of a single bore through the lock block.

16. The cycle accessory as claimed in claim 12 wherein the lock block is elongate and generally transversely oriented with respect to the rigid elongate members when in both the folded and extended configurations.

17. The cycle accessory as claimed in claim 16 wherein the lock block entry is a first lock block entry and the lock block defines a second lock block entry, the first and second lock block entries are formed in side regions of the lock block.

18. The cycle accessory of claim 16 wherein the lock block entry is a first lock block entry and the lock block defines a second lock block entry, the lock block has a generally cylindrical configuration and at least one of the entries has a generally radial orientation.

19. The cycle accessory of claim 18 wherein the first entry and the second entry are oriented to be diametrically opposed.

20. A cycle accessory device as claimed in claim 1 wherein at least two adjacent rigid elongate members are provided with one or more engaging features which hold the at least two rigid elongate members together in their first folded configuration.

21. A cycle accessory device as claimed in claim 1 wherein the free end regions of the first and second rigid elongate members each define a bore, the bores being adapted to receive a lock to secure together the free end regions of the first and second rigid elongate members.

* * * * *